United States Patent
Meeranpillai et al.

(10) Patent No.: US 12,050,165 B2
(45) Date of Patent: Jul. 30, 2024

(54) TESTING DRAG REDUCING AGENT EFFICIENCY

(71) Applicant: Saudi Arabian Oil Company, Dhahran (SA)

(72) Inventors: Nagoorpitchai S. Meeranpillai, Al-Khobar (SA); Ali Almuhaimeed, Al-Qatif (SA); Osama Alzahrani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 63 days.

(21) Appl. No.: 17/681,576

(22) Filed: Feb. 25, 2022

(65) Prior Publication Data

US 2023/0273105 A1   Aug. 31, 2023

(51) Int. Cl.
*G01N 11/14* (2006.01)
*G01N 11/00* (2006.01)

(52) U.S. Cl.
CPC ........ *G01N 11/14* (2013.01); *G01N 2011/006* (2013.01)

(58) Field of Classification Search
CPC ........ G01N 11/14; G01N 11/16; G01N 11/00; G01N 2291/02818; G01N 11/162; G01N 11/167; G01N 11/165; G01N 2011/145; G01N 11/142; G01N 11/10
USPC ............................................. 73/54.01–54.43
See application file for complete search history.

(56) References Cited

U.S. PATENT DOCUMENTS

| | | | | |
|---|---|---|---|---|
| 2,917,065 A | * | 12/1959 | Monk | G01N 11/14 73/54.32 |
| 3,766,773 A | * | 10/1973 | Limpert | G01N 11/04 73/54.12 |
| 3,875,791 A | * | 4/1975 | Fitzgerald | G01N 11/14 73/54.35 |
| 4,045,999 A | * | 9/1977 | Palmer | G01N 11/14 73/54.35 |

(Continued)

FOREIGN PATENT DOCUMENTS

| | | | | |
|---|---|---|---|---|
| CN | 1508215 A | * | 6/2004 | |
| CN | 105628557 A | * | 6/2016 | ............. G01N 11/00 |

(Continued)

OTHER PUBLICATIONS

ESPACENET Machine Translation of CN 1508215 A Originally Published on Jun. 30, 2004. (Year: 2004).*

(Continued)

*Primary Examiner* — Daniel S Larkin
(74) *Attorney, Agent, or Firm* — Fish & Richardson P.C.

(57) ABSTRACT

A drag reducing efficiency test is performed on a sample. The sample includes a crude-oil based fluid and a drag reducing agent. The sample is placed within an inner volume defined by a sample housing. A sensing portion of a sensor is submerged in the sample within the sample housing. The sensor includes a disk (sensing portion) and a supporting rod. A lid is placed on the sample housing to isolate the sample within the inner volume. The sensor is coupled to an air bearing motor. The sensor is rotated by the air bearing motor at a plurality of shear rates. For each shear rate, the sensor measures a torque applied by the sample on the disk in response to the disk rotating while submerged in the respective sample at the respective shear rate.

11 Claims, 7 Drawing Sheets

(56) References Cited

U.S. PATENT DOCUMENTS

| | | | | |
|---|---|---|---|---|
| 4,386,518 A * | 6/1983 | Zatko | G01N 33/1826 | 73/61.78 |
| 4,402,215 A * | 9/1983 | Guastavino | G01N 11/04 | 73/54.07 |
| 4,765,180 A * | 8/1988 | Clifton | G01N 11/14 | 73/54.33 |
| 4,884,437 A * | 12/1989 | Constant | G01N 11/00 | 73/54.01 |
| 5,097,164 A * | 3/1992 | Nakasugi | H02K 5/10 | 310/90 |
| 5,103,335 A * | 4/1992 | Sugiura | G02B 7/1821 | 310/90 |
| 5,789,839 A * | 8/1998 | Langenbeck | F16C 33/107 | 310/90 |
| 5,957,588 A * | 9/1999 | Wahl | F16C 17/105 | 384/108 |
| 5,987,970 A * | 11/1999 | Ball | G01N 11/14 | 73/54.28 |
| 6,167,752 B1 * | 1/2001 | Raffer | G01N 11/142 | 73/843 |
| 6,730,752 B2 * | 5/2004 | Eaton | C10L 1/1641 | 502/103 |
| 6,952,950 B2 * | 10/2005 | Doe | G01D 3/022 | 73/54.01 |
| 7,017,393 B2 * | 3/2006 | Doe | F16C 32/044 | 73/54.28 |
| 7,021,123 B2 * | 4/2006 | Wallevik | G01N 11/14 | 73/54.38 |
| 7,275,419 B2 * | 10/2007 | Raffer | G01N 11/142 | 73/54.01 |
| 7,468,402 B2 | 12/2008 | Yang et al. | | |
| 7,526,941 B2 * | 5/2009 | Doe | G01N 11/14 | 73/1.02 |
| 7,992,427 B2 * | 8/2011 | Tonmukayakul | G01N 11/14 | 73/54.38 |
| 8,043,388 B2 | 10/2011 | Waters et al. | | |
| 8,105,985 B2 * | 1/2012 | Wood | C09K 8/602 | 507/260 |
| 8,450,250 B2 * | 5/2013 | Milligan | F17D 1/17 | 507/221 |
| 9,255,872 B2 * | 2/2016 | Raffer | G01N 11/14 | |
| 9,261,446 B2 * | 2/2016 | Raffer | G01N 11/14 | |
| 9,285,080 B2 | 3/2016 | Fan et al. | | |
| 9,513,201 B2 * | 12/2016 | Anderson | G01N 11/10 | |
| 9,534,996 B2 * | 1/2017 | Doe | G01N 11/142 | |
| 10,031,057 B2 * | 7/2018 | Romirer | G01N 11/14 | |
| 10,161,843 B2 * | 12/2018 | Doe | G01N 11/14 | |
| 10,180,381 B2 * | 1/2019 | Krenn | G01L 1/26 | |
| 10,337,972 B2 * | 7/2019 | Meng | G01N 11/142 | |
| 11,199,296 B2 * | 12/2021 | Zou | C10M 143/00 | |
| 11,236,609 B2 * | 2/2022 | McDaniel | B01F 35/22142 | |
| 11,340,151 B2 * | 5/2022 | Schmidegg | G01N 11/14 | |
| 11,644,401 B2 * | 5/2023 | Leyser | G01N 33/86 | 435/13 |
| 11,698,330 B2 * | 7/2023 | Owens | G01N 11/14 | 73/54.02 |
| 11,719,612 B2 * | 8/2023 | Lee | G01N 11/142 | 73/54.01 |
| 2004/0173009 A1 * | 9/2004 | Doe | G01D 3/022 | 702/122 |
| 2010/0004890 A1 * | 1/2010 | Tonmukayakul | G01N 11/14 | 702/113 |
| 2014/0137638 A1 * | 5/2014 | Liberzon | G01N 11/14 | 73/54.28 |
| 2014/0208834 A1 * | 7/2014 | Doe | G01N 11/14 | 73/54.28 |
| 2017/0184481 A1 * | 6/2017 | Doe | G01N 11/142 | |
| 2019/0153304 A1 | 5/2019 | Zelenev | | |
| 2022/0011210 A1 * | 1/2022 | Krenn | F16C 32/0611 | |
| 2023/0184067 A1 | 6/2023 | Meeranpillai et al. | | |

FOREIGN PATENT DOCUMENTS

| | | | | |
|---|---|---|---|---|
| CN | 108181205 A * | 6/2018 | | G01N 11/142 |
| CN | 114397227 A * | 4/2022 | | |
| CN | 114556078 A * | 5/2022 | | G01N 11/14 |

OTHER PUBLICATIONS

ESPACENET Machine Translation of JP 2000078795 A Which Originally Published on Mar. 14, 2000. (Year: 2000).*

Anton-Paar, "Modular Compact Rheometer MCR 72/92", available on the internet at <web.archive.org/web/20220119160249/https://www.anton-paar.com/us-en/products/details/rheometer-mcr-72-and-mcr-92/>, Jan. 19, 2022. (Year: 2022).*

Specialty Components, "Introduction to Air Bearings", available on the internet at <web.archive.org/web/20220203161525/https://www.specialtycomponents.com/Resources/Technical-Articles/Introduction-to-Air-Bearings/>, Feb. 3, 2022. (Year: 2022).*

Brookfield Ametek Product Catalog, 2018. (Year: 2018).*

Chinafloc.com [online], "Oilfield chemicals/DRA (drag reducing agent) used for crude oil pipeline transportation," 2017, retrieved on Feb. 3, 2022 from URL <https://www.chinafloc.com/DRA-Drag-reducing-agent-used-for-crude-oil-pipeline-transportation_1553.html>, 4 pages.

Dennington, "Miniaturized rotating disc rheometer test for rapid screening of drag reducing marine coatings," Surface Topography: Metrology and Properties, Sep. 2015, 3:034004, 10 pages.

Hong et al., "Rotating disk apparatus for polymer-induced turbulent drag reduction," Journal of Mechanical Science and Technology, 2008, 22:1908-1913, 6 pages.

Kim et al., "A high-precision rotating disk apparatus for drag reduction characterization," Polymer Testing, 2001, 20:43-48, 6 pages.

Liquidpower.com [online], "About DRA and how it works," 2022, retrieved on Feb. 3, 2022 from URL <https://www.liquidpower.com/what-is-dra/about-dra-and-how-it-works/> 3 pages.

Schatcogmbh.com [online], "Drag reducing agent (DRA)," retrieved on Feb. 3, 2022 from URL <https://schatcogmbh.com/product/drag-reducing-agent-dra/>, 2 pages.

da Silva et al., "New Experimental Technique To Measure the Efficiency of Drag Reducer Additives for Oil Samples," Energy Fuels, Jul. 23, 2009, 23(9):4529-4532, 4 pages.

Phan et al., "Polypeptide Composition and Topology Affect Hydrogelation of Star-Shaped Poly(l-lysine)-Based Amphiphilic Copolypeptides," Gels, Aug. 30, 2021, 7(131):1-13, 13 pages.

SAIP Examination Report in SAIP Appln. No. 123441281, dated May 15, 2024, 16 pages, with English Translation.

* cited by examiner

100

200C

TESTING DRAG REDUCING AGENT EFFICIENCY

TECHNICAL FIELD

This disclosure relates to testing of drag reducing agents in fluids.

BACKGROUND

As fluid flows within a pipe, the fluid pushes up against the inside wall of the pipe. In response, the pipe pushes the fluid back, causing a swirling of turbulence, which can create a drag force on the fluid. This turbulence can cause frictional pressure losses in the fluid, which can slow down the flow of the fluid in the pipe. A drag reducing agent can be added to the fluid to reduce the effects of frictional pressure loss and turbulence in the pipe.

SUMMARY

This disclosure describes technologies relating to testing of drag reducing agents in fluids. Certain aspects of the subject matter disclosed can be implemented as a method. A drag reducing efficiency test is performed on a first sample of a plurality of samples. Each sample of the plurality of samples includes a crude-oil based fluid that includes a hydrocarbon. Each sample of the plurality of samples includes a drag reducing agent that includes a polymer. Each sample of the plurality of samples has a different concentration of the drag reducing agent. The drag reducing efficiency test includes placing the respective sample within an inner volume defined by a sample housing. The drag reducing efficiency test includes submerging a sensing portion of a sensor in the respective sample within the sample housing. The sensor includes a disk and a supporting rod. The supporting rod includes a first end and a second end. The first end is attached to the disk. The disk is the sensing portion of the sensor. The drag reducing efficiency test includes placing a lid on the sample housing to isolate the respective sample within the inner volume. The lid defines an inner bore. Placing the lid on the sample housing includes passing the supporting rod through the inner bore. The drag reducing efficiency test includes coupling the second end of the supporting rod of the sensor to an air bearing motor. The drag reducing efficiency test includes, for each shear rate of a plurality of shear rates, rotating (by the air bearing motor coupled to the sensor) the sensor at the respective shear rate. The drag reducing efficiency test includes, for each shear rate of a plurality of shear rates, measuring (by the sensor) a torque applied by the respective sample on the disk in response to the disk rotating while submerged in the respective sample at the respective shear rate. The drag reducing efficiency test is performed on the remaining samples of the plurality of samples.

This, and other aspects, can include one or more of the following features. The crude-oil based fluid can include at least one of crude oil, gasoline, diesel, or jet fuel. The polymer can have a molecular weight in a range of from 4,000,000 to 20,000,000 Daltons. Each shear rate can be in a range of from 1 inverse second ($s^{-1}$) to 5,000 $s^{-1}$. Each sample of the plurality of samples can have a different concentration of the drag reducing agent in a range of from 5 parts per million (ppm) to 200 ppm. The plurality of samples can include the first sample, a second sample, a third sample, and the fourth sample. The first sample can have a drag reducing agent concentration of about 10 ppm. The second sample can have a drag reducing agent concentration of about 20 ppm. The third sample can have a drag reducing agent concentration of about 50 ppm. The fourth sample can have a drag reducing agent concentration of about 100 ppm. A computer can be communicatively coupled to the sensor. The method can include displaying (by the computer) a plot including a curve of the measured torque versus shear rate for the first sample. The method can include displaying (by the computer) a composite plot that includes a plurality of curves. Each of the plurality of curves can be a curve of the measured torque versus shear rate for a different one of each of the plurality of samples. The method can include performing the drag reducing efficiency test on a second plurality of samples. The drag reducing agent can be a first drag reducing agent. The polymer can be a first polymer. Each sample of the second plurality of samples can include the crude-oil based fluid. Each sample of the second plurality of samples can include a second drag reducing agent that includes a second polymer. Each sample of the second plurality of samples can have a different concentration of the second drag reducing agent. The second polymer can be different from the first polymer. The second polymer can have a molecular weight in a range of from 4,000,000 to 20,000,000 Daltons. The method can include displaying (by the computer) a second composite plot that includes a second plurality of curves. Each of the second plurality of curves can be a curve of the measured torque versus shear rate for a different one of each of the second plurality of samples. The method can include comparing the first composite plot and the second composite plot to determine which of the first drag reducing agent or the second drag reducing agent is chosen for application.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes testing the drag reducing efficiency of drag reducing chemical agents in fluids, and in particular, crude-oil based fluids that include at least one hydrocarbon. The apparatus described includes a rheometer that includes a rotating disk within a sample housing. A sample including a crude-oil based fluid and a drag reducing agent (DRA) is placed within the housing. The disk is submerged in the sample and rotated at various speeds to determine the drag reducing agent's drag reducing ability. The rheometer measures torque and angular velocity. Shear stress can be measured by Equation (1).

$$\sigma = M \times K_\sigma, \quad (1)$$

where $\sigma$ is stress in Pascal or dyne per square centimeter (dyne/cm$^2$), M is torque in Newton-meters (N-m) or gram-force centimeter (gm-cm), and $K_\sigma$ is the stress constant (geometry-dependent).

The subject matter described in this disclosure can be implemented in particular implementations, so as to realize one or more of the following advantages. The systems and methods described herein implement air bearing motors, which can provide superior and accurate control of shear rate, for example, shear rates greater than 4,000 inverse seconds (s$^{-1}$) in comparison to oil-bearing and ball bearing motors. The air bearing motors can also exhibit less vibration and tolerate wider temperature ranges in comparison to oil-bearing and ball bearing motors. The air bearing motors can also produce less frictional rotation, which can be used to detect small torque changes in fluid flow characteristics.

Figure 1A:
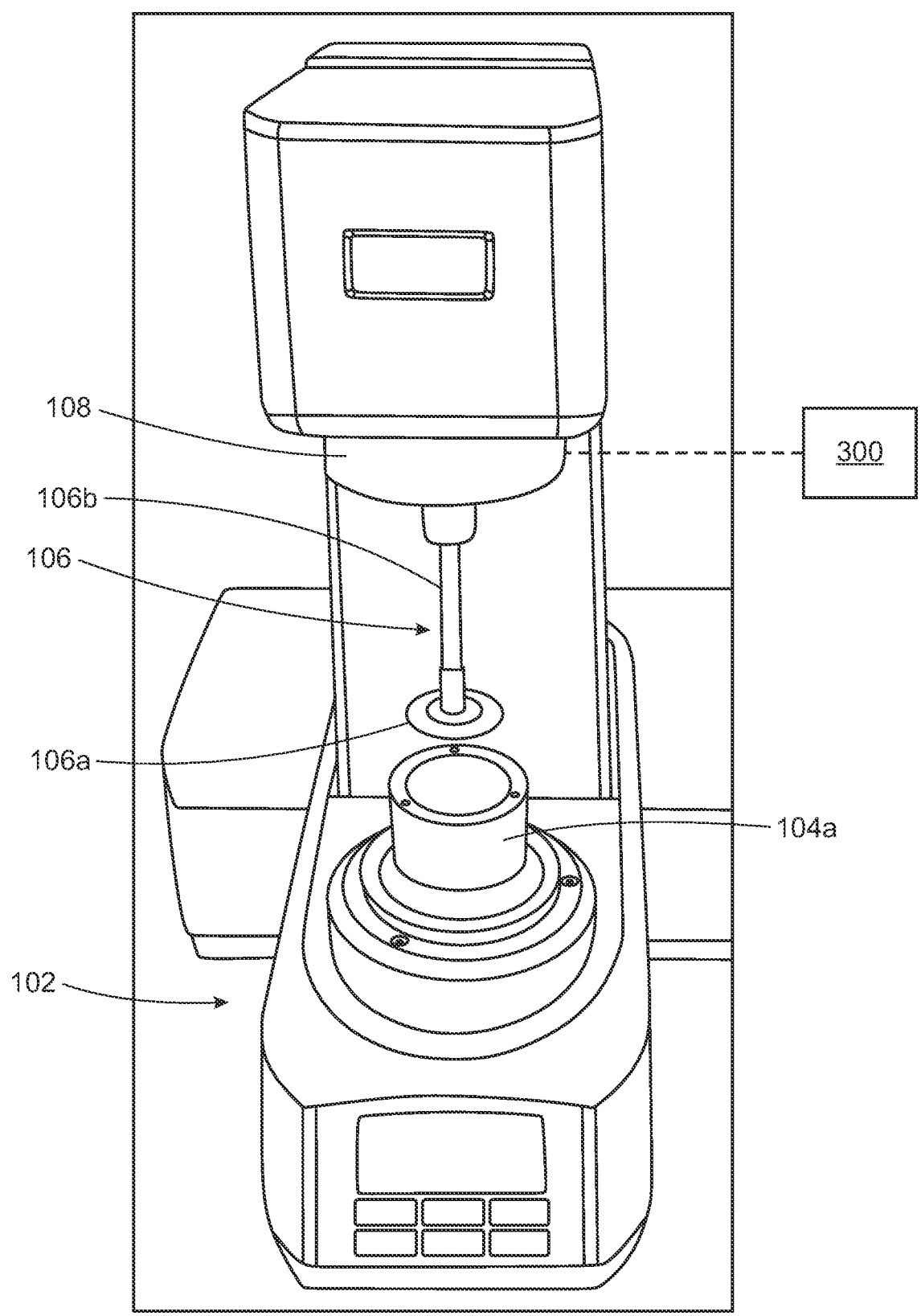
FIG. 1A is a schematic diagram of an example system for testing a drag reducing agent.
Figure 1B:
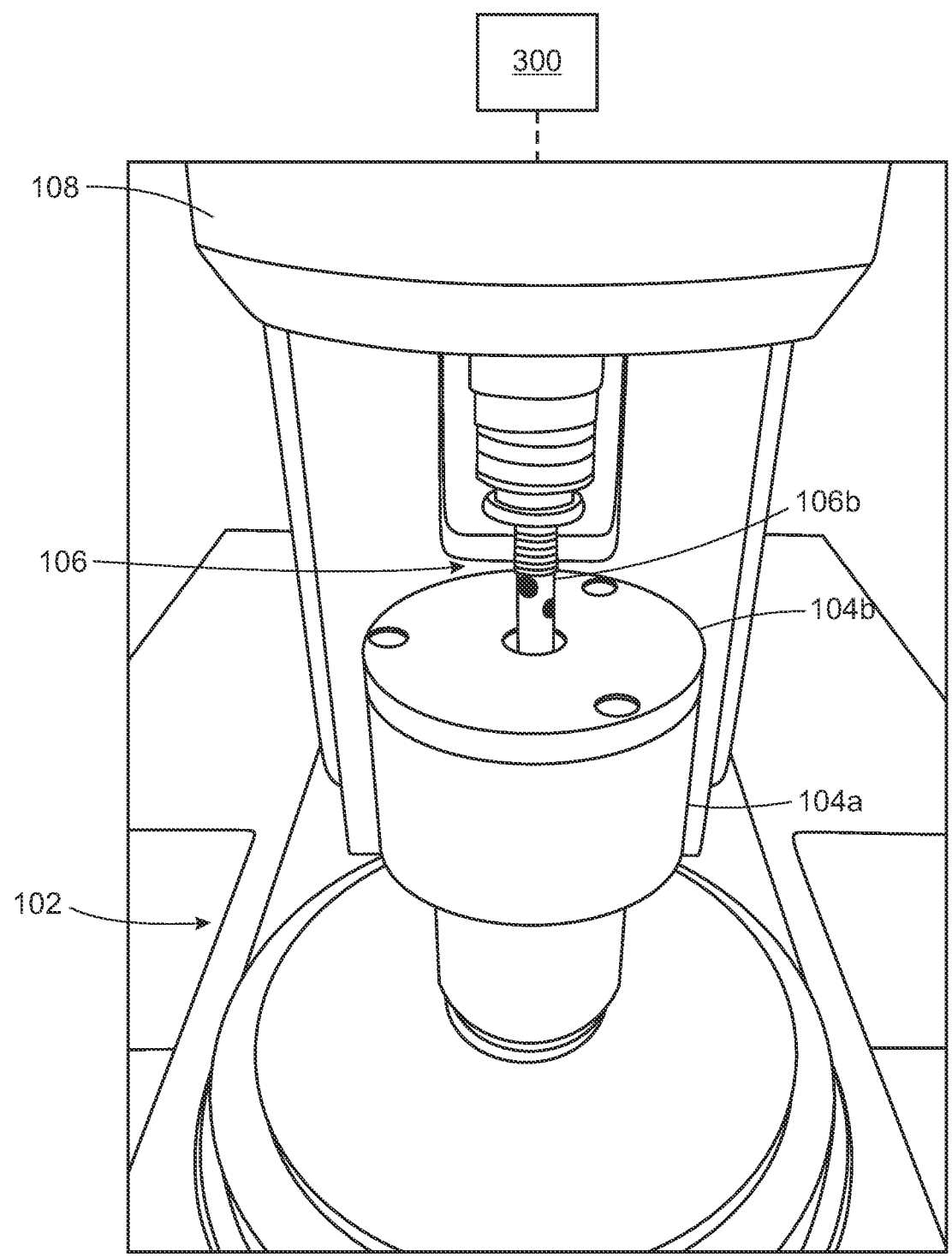
FIG. 1B is a schematic diagram of the system of FIG. 1A in which the sample housing is closed.

FIG. 1A depicts a system 100 that can be used to test a drag reducing efficiency of a drag reducing agent. The system 100 includes a rotating disk apparatus 102. The apparatus 102 includes a sample housing 104a defining an inner volume. The apparatus 102 includes a lid 104b that can be placed on the sample housing 104a. The lid 104b defines an inner bore. The apparatus 102 includes a sensor 106. The sensor 106 includes a disk 106a and a supporting rod 106b. The disk 106a of the sensor 106 is the sensing portion of the sensor 106. The supporting rod 106b has a first end and a second end. The first end of the rod 106b is attached to the disk 106a. The second end of the rod 106b is configured to couple to an air bearing motor 108. The rod 106b can pass through the inner bore defined by the lid 104b. The apparatus 102 includes the air bearing motor 108. FIG. 1B depicts the system 100, in which the rod 106b is coupled to the air bearing motor 108.

A sample can be placed within the inner volume of the sample housing 104a. The sample can include, for example, a crude-oil based fluid and a drag reducing agent. The crude-oil based fluid includes a hydrocarbon. Some examples of a crude-oil based fluid include crude oil, gasoline, diesel, or jet fuel. The drag reducing agent includes a polymer. The polymer can be an alpha olefin polymer (poly($\alpha$-olefin)). For example, the polymer can include monomers that include alkenes (with a general formula of $C_xH_{2x}$) or polystyrene ($C_6H_5CH{=}C\,H_2$). In some implementations, the polymer has a molecular weight in a range of from 4,000,000 to 20,000,000 Daltons (Da). The drag reducing agent can include, for example, from about 50 weight percent (wt. %) to about 75 wt. % of the polymer. In some implementations, the drag reducing agent includes a stabilizing agent, such as a homogenizer. The drag reducing agent can include, for example, from about 10 wt. % to about 15 wt. % of the stabilizing agent. In some implementations, the drag reducing agent includes a viscosity modifier, such as a viscosity thinner. The drag reducing agent can include, for example, from about 10 wt. % to about 15 wt. % of the viscosity modifier.

The disk 106a of the sensor 106 can be submerged in the sample within the sample housing 104a. The lid 104b can be placed on the sample housing 104a to isolate the sample within the inner volume defined by the sample housing 104a. Placing the lid 104b on the sample housing 104a can include passing the rod 106b through the inner bore defined by the lid 104b. The second end of the rod 106b can be coupled to the air bearing motor 108. The air bearing motor 108 can rotate the sensor 106. The air bearing motor 108 is a non-contact motor in which a gas film (for example, air) acts as the lubricant that separates the motor 108 from the rod 106b of the sensor 106, which rotates in relation to the motor 108. The air bearing motor 108 can be an aerostatic air bearing motor or an aerodynamic air bearing motor. In some cases, the air bearing motor 108 is externally pressurized, in which a separate external supply of gas (for example, air) is provided under pressure between the motor 108 and the rod 106b. In some cases, the air bearing motor 108 is self-generating, in which a supporting gas film (for example, air) is generated by the relative motion of the motor 108 and the rod 106b.

Figure 3:
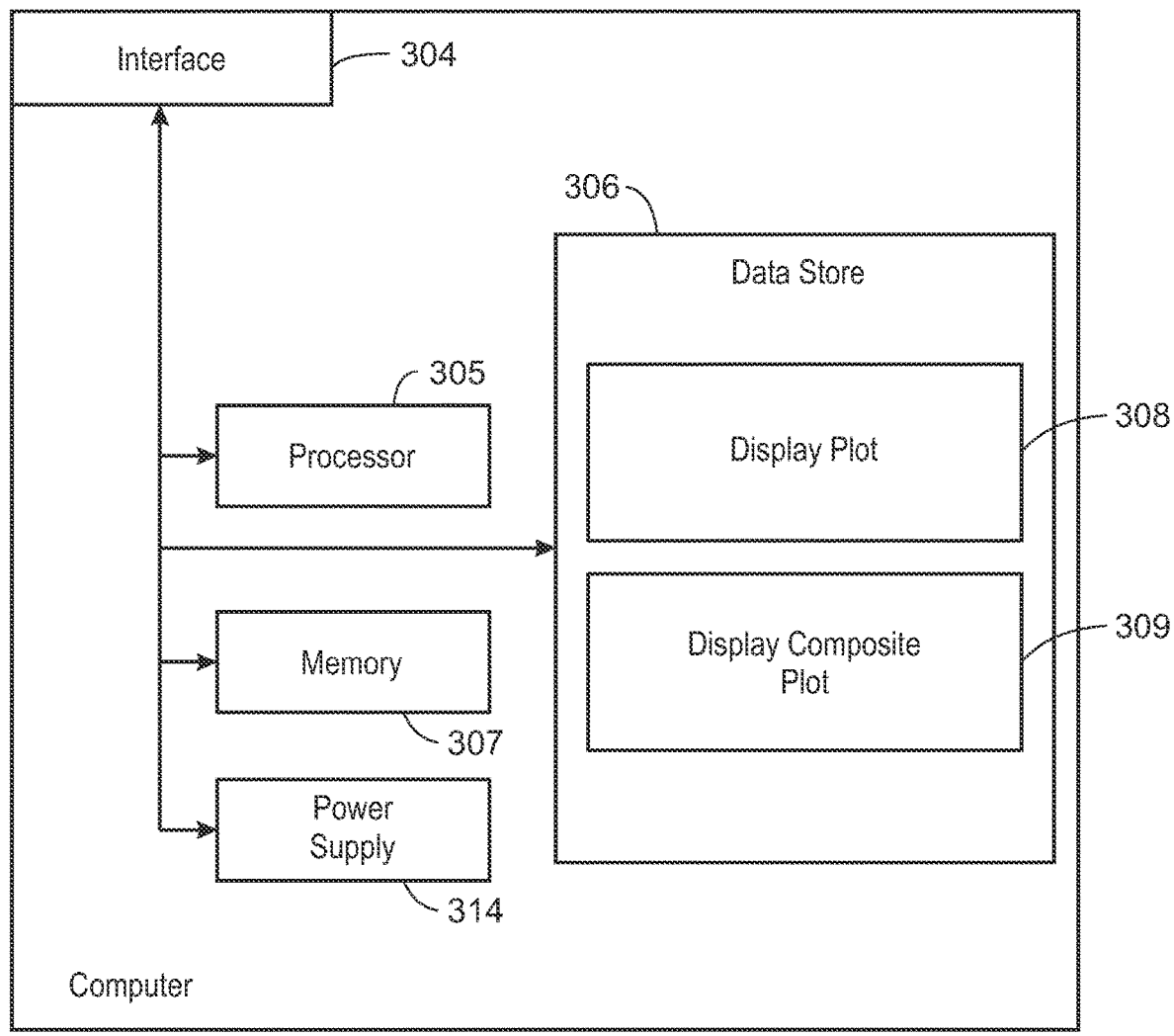
FIG. 3 is a block diagram of an example computer system.

The system 100 can include a computer 300. The computer 300 can be communicatively coupled to the sensor 106 and the motor 108. The computer 300 can receive measurements (for example, torque measurements) from the sensor 106. The computer 300 can control the motor 108. For example, the computer 300 can control the speed at which the motor 108 rotates the sensor 106. The computer 300 can, for example, display the results (such as a plot of data) of an experimental run of testing the drag reducing efficiency of a drag reducing agent. The computer 300 is also shown in FIG. 3 and is described in more detail later.

Figure 2A:
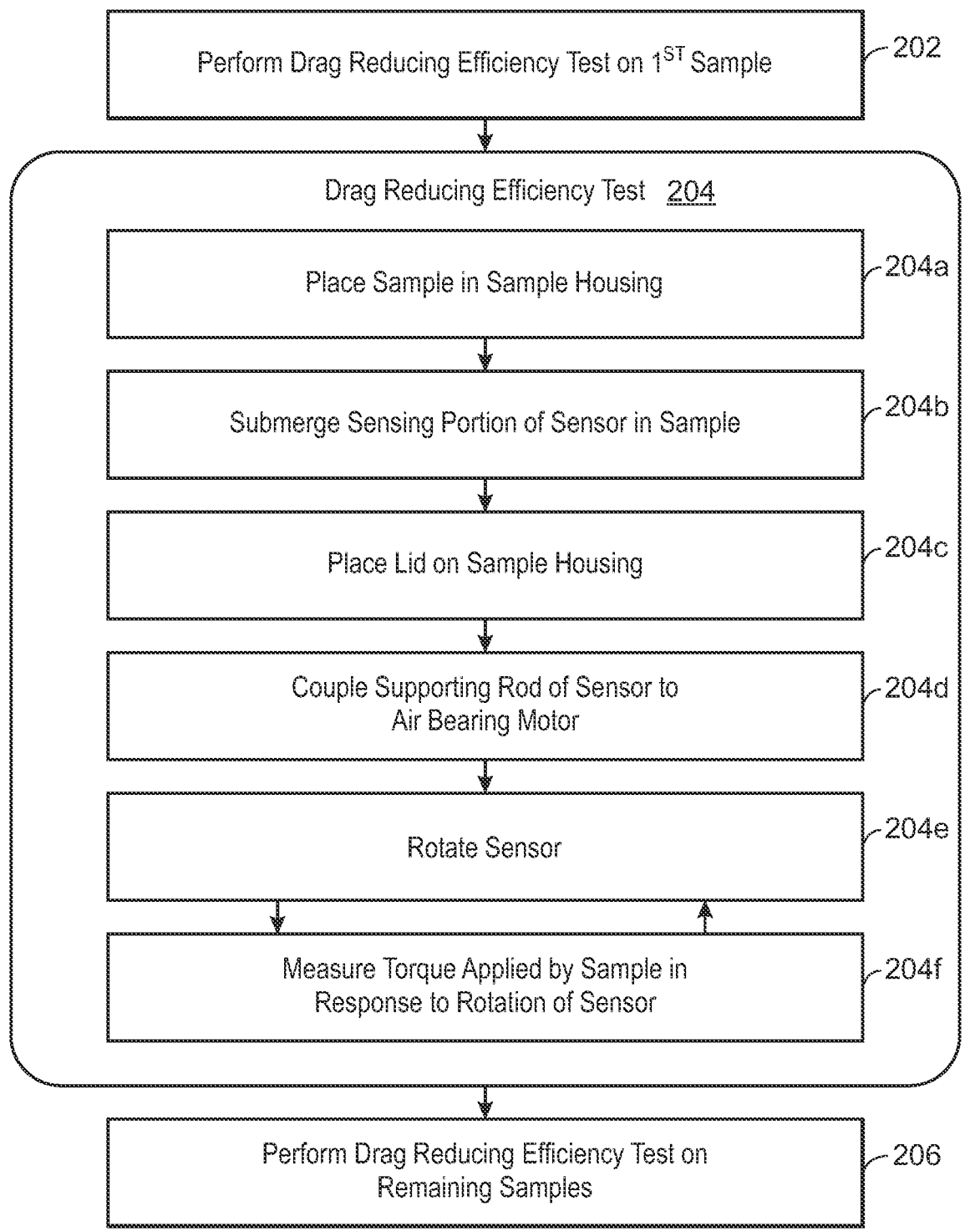
FIG. 2A is a flow chart of an example method for testing a drag reducing agent.

FIG. 2A is a flow chart of an example method 200A which can be implemented to test a drag reducing agent. The system 100 can, for example, be used to implement the method 200A. At block 202, a drag reducing efficiency test 204 is performed on a first sample. The first sample is one of various samples. Each of the samples include a crude-oil based fluid and a drag reducing agent. As mentioned previously, the crude-oil based fluid includes a hydrocarbon, and the drag reducing agent includes a polymer. Each of the samples have a different concentration of the drag reducing agent. The drag reducing efficiency test includes blocks 204a, 204b, 204c, 204d, 204e, and 204f. At block 204a, the sample is placed within an inner volume defined by a sample housing (such as the sample housing 104a). At block 204b, a sensing portion of a sensor (such as the sensor 106) is submerged in the sample within the sample housing 104a. As mentioned previously, the sensor 106 includes a disk 106a and a supporting rod 106b, and the disk 106a is the sensing portion of the sensor 106. At block 204c, a lid (such as the lid 104b) is placed on the sample housing 104a to isolate the sample within the inner volume. As mentioned previously, the lid 104b defines an inner bore. Placing the lid 104b on the sample housing 104a at block 204c includes passing the rod 106b through the inner bore of the lid 104b. At block 204d, the second end of the rod 106b is coupled to an air bearing motor (such as the air bearing motor 108). At block 204e, the sensor 106 (including the disk 106a and the rod 106b) is rotated by the air bearing motor 108. At block 204f, a torque, applied by the sample on the disk 106a in response to the disk 106a rotating while submerged in the sample, is measured by the sensor 106, and in particular, the disk 106a, which is the sensing portion of the sensor 106. Blocks 204e and 204f are repeated for various shear rates. In some implementations, the shear rates for blocks 204e and 204f are each in a range of from 1 s$^{-1}$ to 5,000 s$^{-1}$. At least a portion of the method 200A may be controlled by the computer 300. For example, blocks 204e and 204f can be implemented and controlled by the computer 300.

At block 206, the drag reducing efficiency test 204 is performed on the remaining samples. In some implementations, each of the samples (for blocks 202 and 206) have a different concentration of the drag reducing agent, and each of the concentrations of the drag reducing agent are in a range of from 5 parts per million (ppm) to 1,000 ppm, from 5 ppm to 800 ppm, from 5 ppm to 600 ppm, from 5 ppm to 400 ppm, from 5 ppm to 200 ppm, from 5 ppm to 100 ppm, or from 5 ppm to 50 ppm. For example, there can be four samples in which the first sample has a drag reducing agent concentration of about 10 ppm, a second sample has a drag reducing agent concentration of about 20 ppm, a third sample has a drag reducing agent concentration of about 50 ppm, and a fourth sample has a drag reducing agent concentration of about 100 ppm.

In some implementations, the method 200A includes displaying a plot that includes a curve of the measured torque (block 204f) versus shear rate for the first sample. The plot can be displayed, for example, by the computer 300, which is communicatively coupled to the sensor 106. The method 200A can include displaying a composite plot that includes multiple curves. For example, each of the curves can be a curve of the measured torque (block 204f) versus shear rate for a different one of each of the samples for which the drag reducing efficiency test 204 is performed (blocks 202 and 206).

The method 200A can be repeated on a second set of samples which include a different drag reducing agent. For example, method 200A can be implemented on a first set of samples that include different concentrations of a first drag reducing agent and on a second set of samples that include different concentrations of a second drag reducing agent that is different from the first drag reducing agent. A first composite plot for the first set of samples and a second composite plot for the second set of samples can be displayed. The first and second composite plots can be compared to determine which of the first or second drag reducing agents is chosen for application in the field.

Figure 2B:
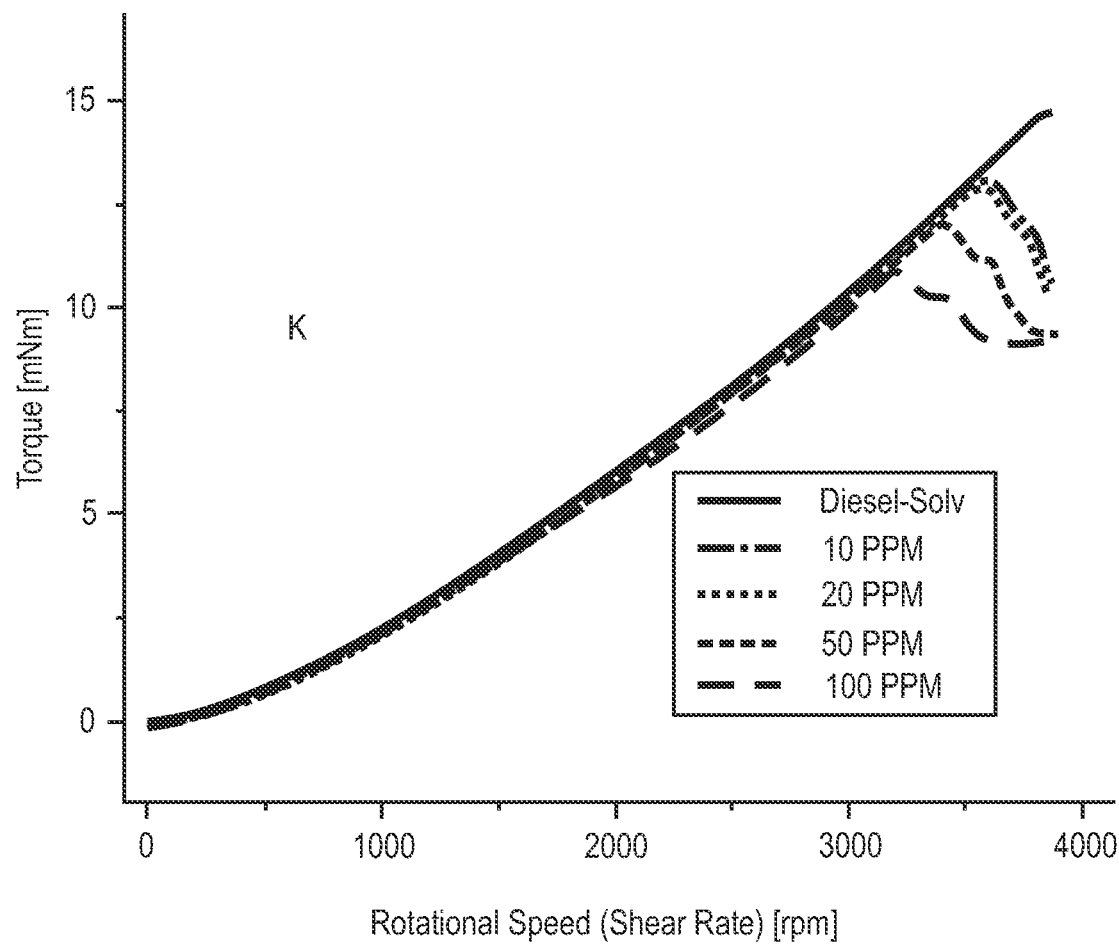
FIG. 2B is a plot showing results of a first experimental run for a first drag reducing agent.

FIG. 2B is a composite plot 200B of a first set of samples including a first drag reducing agent. The first drag reducing agent was FloMx by Baker Hughes, with a molecular weight of about 20,000,000 Da. The first drag reducing agent was tested in diesel. Therefore, each of the first set of samples included diesel. The first set of samples included a first sample with no drag reducing agent (control), a second sample with a first drag reducing agent concentration of 10 ppm, a third sample with a first drag reducing agent concentration of 20 ppm, a fourth sample with a first drag reducing agent concentration of 50 ppm, and a fifth sample with a first drag reducing agent concentration of 100 ppm. The sensor 106 was rotated at shear rates in a range of from 1 s$^{-1}$ to 4,000 s$^{-1}$. The drag reducing efficiency (DR %) was calculated by Equation (2).

$$DR\,\% = \frac{T_s - T_p}{T_s} \times 100\% \tag{2}$$

where $T_s$ is the measured torque of control (solvent with no drag reducing agent) and $T_p$ is the measured torque of the sample with the respective drag reducing agent concentration. Table 1 provides results related to the experiment for plot 200B of FIG. 2B.

TABLE 1

Experimental results for first drag reducing agent

| DRA Concentration (ppm) | Shear Rate (s$^{-1}$) | Measured Torque (mN-m) | DR % |
|---|---|---|---|
| 0 | >3,900 | 14.0 | — |
| 10 | 3,600 | 11.7 | 16.4% |
| 20 | 3,550 | 11.5 | 17.9% |

TABLE 1-continued

Experimental results for first drag reducing agent

| DRA Concentration (ppm) | Shear Rate (s$^{-1}$) | Measured Torque (mN-m) | DR % |
|---|---|---|---|
| 50 | 3,400 | 11.0 | 21.4% |
| 100 | 3,200 | 10.5 | 25.0% |

Figure 2C:
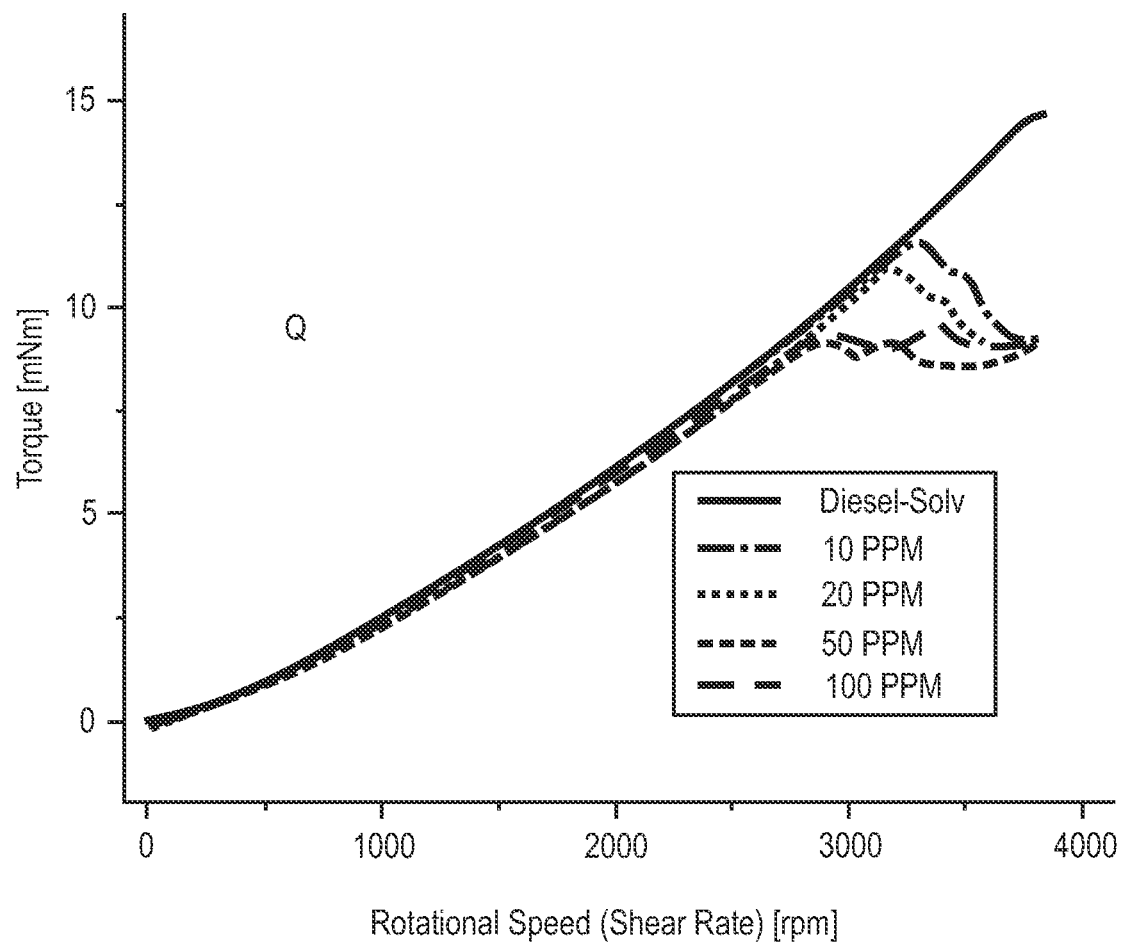
FIG. 2C is a plot showing results of a second experimental run for a second drag reducing agent.

FIG. 2C is a composite plot 200C of a second set of samples including a second drag reducing agent. The second drag reducing agent was Turboflo SV by Flowchem, with a molecular weight of about 20,000,000 Da. The second drag reducing agent was tested in diesel. Therefore, each of the second set of samples included diesel. The second set of samples included a first sample with no drag reducing agent (control), a second sample with a second drag reducing agent concentration of 10 ppm, a third sample with a second drag reducing agent concentration of 20 ppm, a fourth sample with a second drag reducing agent concentration of 50 ppm, and a fifth sample with a second drag reducing agent concentration of 100 ppm. The sensor 106 was rotated at shear rates in a range of from 1 s$^{-1}$ to 4,000 s$^{-1}$. Table 2 provides results related to the experiment for plot 200C of FIG. 2C.

TABLE 2

Experimental results for second drag reducing agent

| DRA Concentration (ppm) | Shear Rate (s$^{-1}$) | Measured Torque (mN-m) | DR % |
|---|---|---|---|
| 0 | 3,900 | 14.0 | — |
| 10 | 3,400 | 11.0 | 21.4% |
| 20 | 3,100 | 10.5 | 25.0% |
| 50 | 2,900 | 9.5 | 32.1% |
| 100 | 2,850 | 9.4 | 32.9% |

Figure 2D:
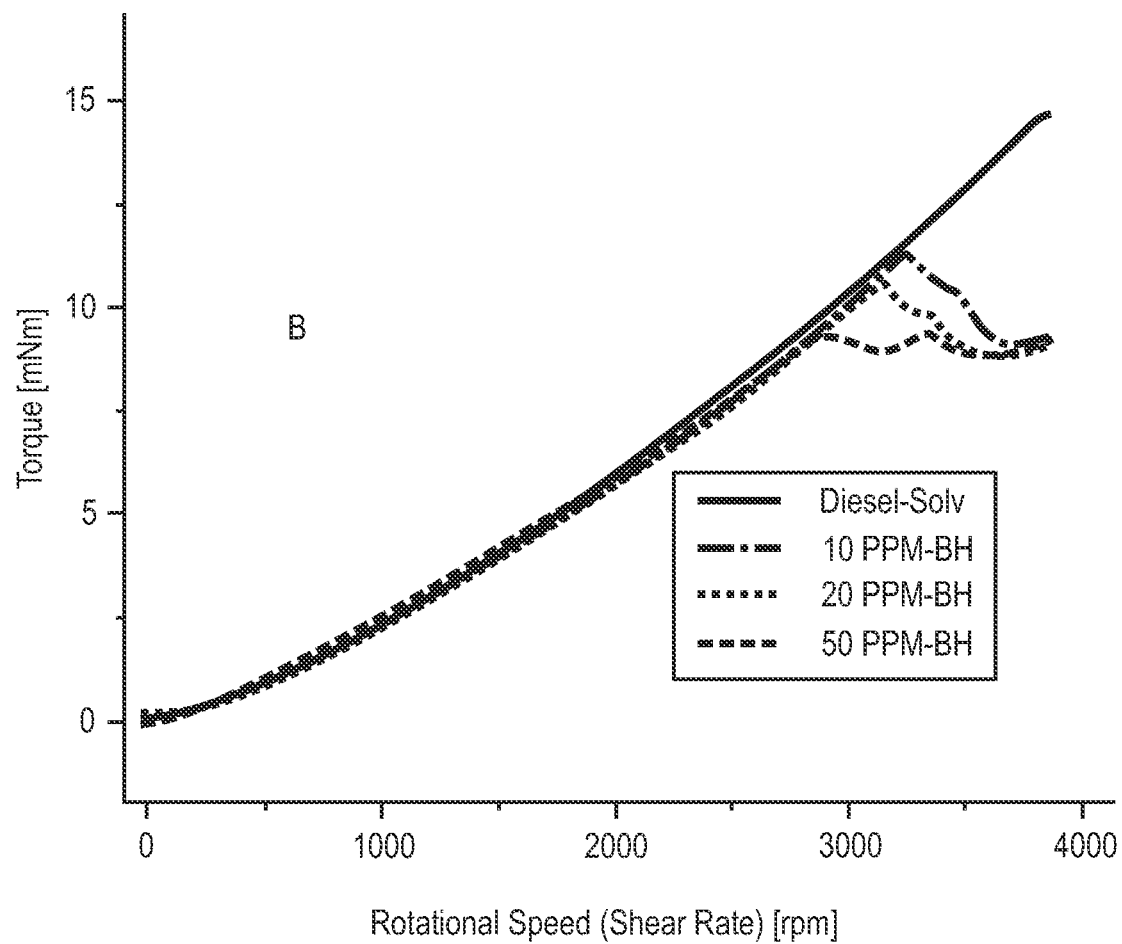
FIG. 2D is a plot showing results of a third experimental run for a third drag reducing agent.

FIG. 2D is a composite plot 200D of a third set of samples including a third drag reducing agent. The third drag reducing agent was LP by LiquidPower, with a molecular weight of about 20,000,000 Da. The third drag reducing agent was tested in diesel. Therefore, each of the third set of samples included diesel. The third set of samples included a first sample with no drag reducing agent (control), a second sample with a third drag reducing agent concentration of 10 ppm, a third sample with a third drag reducing agent concentration of 20 ppm, and a fourth sample with a third drag reducing agent concentration of 50 ppm. The sensor 106 was rotated at shear rates in a range of from 1 s$^{-1}$ to 4,000 s$^{-1}$. Table 3 provides results related to the experiment for plot 200D of FIG. 2D.

TABLE 3

Experimental results for third drag reducing agent

| DRA Concentration (ppm) | Shear Rate (s$^{-1}$) | Measured Torque (mN-m) | DR % |
|---|---|---|---|
| 0 | 3,900 | 14.0 | — |
| 10 | 3,600 | 11.0 | 21.4% |
| 20 | 3,150 | 10.5 | 25.0% |
| 50 | 2,850 | 9.5 | 32.1% |

As shown in plots 200B, 200C, and 200D of FIGS. 2B, 2C, and 2D, respectively, a drag reducing effect was not observed until the shear rate reached at least about 2,000 s$^{-1}$ for each of the first, second, and third drag reducing agents.

Further, increasing the concentration of the drag reducing agent caused the drag reducing effect to appear at lower (shear rates.

FIG. 3 is a block diagram of an example computer 300 used to provide computational functionalities associated with described algorithms, methods, functions, processes, flows, and procedures, as described in this specification, according to an implementation. The illustrated computer 300 is intended to encompass any computing device such as a server, desktop computer, laptop/notebook computer, one or more processors within these devices, or any other processing device, including physical or virtual instances (or both) of the computing device. Additionally, the computer 300 can include a computer that includes an input device, such as a keypad, keyboard, touch screen, or other device that can accept user information, and an output device that conveys information associated with the operation of the computer 300, including digital data, visual, audio information, or a combination of information.

The computer 300 includes an interface 304. Although illustrated as a single interface 304 in FIG. 3, two or more interfaces 304 may be used according to particular needs, desires, or particular implementations of the computer 300. Although not shown in FIG. 3, the computer 300 can be communicably coupled with a network. The interface 304 is used by the computer 300 for communicating with other systems that are connected to the network in a distributed environment. Generally, the interface 304 comprises logic encoded in software or hardware (or a combination of software and hardware) and is operable to communicate with the network. More specifically, the interface 304 may comprise software supporting one or more communication protocols associated with communications such that the network or interface's hardware is operable to communicate physical signals within and outside of the illustrated computer 300. The interface 304 can include a control interface, which can be used to couple the computer 300 to controls. In some implementations, the control interface is a bank of relays, a bank of MOSFET power controllers, a serial peripheral interface (SPI), or a Fieldbus, and the like. The interface 304 can include a sensor interface, which can be used to couple the computer 300 to sensors, such as the sensor 106. In some implementations, the sensor interface is a Universal Serial Bus (USB), a bank of analog-to-digital converters (ADCs), a I2C bus, a serial peripheral interface (SPI) bus, or a Fieldbus, and the like. The interface 304 can include a human machine interface, which can be used by a user to interact with the computer 300. In some implementations, the human machine interface includes a monitor or a touch screen that is configured to display information, for example, to a user.

The computer 300 includes a processor 305. The processor 305 may be a microprocessor, a multi-core processor, a multithreaded processor, an ultra-low-voltage processor, an embedded processor, or a virtual processor. In some embodiments, the processor 305 may be part of a system-on-a-chip (SoC) in which the processor 305 and the other components of the computer 300 are formed into a single integrated electronics package. In some implementations, the processor 305 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used. Although illustrated as a single processor 305 in FIG. 3, two or more processors may be used according to particular needs, desires, or particular implementations of the computer 300.

Generally, the processor 305 executes instructions and manipulates data to perform the operations of the computer 300 and any algorithms, methods, functions, processes, flows, and procedures as described in this specification. The processor 305 may communicate with other components of the computer 300 over a bus. The bus may include any number of technologies, such as industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in an SoC based system. Other bus technologies may be used, in addition to, or instead of, the technologies above.

The computer 300 can also include a data store 306 that can be used for long-term storage of programs and data. The data store 306 can be used for persistent storage of information, such as data, applications, operating systems, and so forth for the computer 300 or other components (or a combination of both) that can be connected to the network. Although illustrated as a single data store 306 in FIG. 3, two or more data stores (of the same or combination of types) can be used according to particular needs, desires, or particular implementations of the computer 300 and the described functionality. While data store 306 is illustrated as an integral component of the computer 300, data store 306 can be external to the computer 300. The data store 306 can be used for the persistent storage of information, such as data, applications, operating systems, and so forth. The data store 306 may be a nonvolatile RAM, a solid-state disk drive, or a flash drive, among others. In some implementations, the data store 306 will include a hard disk drive, such as a micro hard disk drive, a regular hard disk drive, or an array of hard disk drives, for example, associated with a DCS or a cloud server.

The computer 300 also includes a memory 307 that can hold data for the computer 300 or other components (or a combination of both) that can be connected to the network. Although illustrated as a single memory 307 in FIG. 3, two or more memories 307 (of the same or combination of types) can be used according to particular needs, desires, or particular implementations of the computer 300 and the described functionality. While memory 307 is illustrated as an integral component of the computer 300, memory 307 can be external to the computer 300. The memory 307 can be a transitory or non-transitory storage medium. In some implementations, such as in PLCs and other process control units, the memory 307 is integrated with the database 306 used for long-term storage of programs and data. The memory 307 can include any number of volatile and non-volatile memory devices, such as volatile random-access memory (RAM), static random-access memory (SRAM), flash memory, and the like. In smaller devices, such as PLCs, the memory 307 may include registers associated with the processor 305 itself.

The memory 307 and/or the data store 306 stores computer-readable instructions executable by the processor 305 that, when executed, cause the processor 305 to perform operations, such as displaying a plot that includes a curve of the measured torque versus shear rate (block 308) or displaying a composite plot (block 309, examples of which are shown by plots 200B, 200C, and 200D of FIGS. 2B, 2C, and 2D, respectively). The computer 300 can also include a power supply 314. The power supply 314 can include a rechargeable or non-rechargeable battery that can be configured to be either user- or non-user-replaceable. The power supply 314 can be hard-wired. There may be any number of computers 300 associated with, or external to, a computer system containing computer 300, each computer 300 communicating over the network. Further, the term "client," "user," "operator," and other appropriate terminology may be used interchangeably, as appropriate, without departing from this specification. Moreover, this specification contemplates that many users may use one computer 300, or that one user may use multiple computers 300.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
   performing a drag reducing efficiency test on a first sample of a plurality of samples, wherein each sample of the plurality of samples comprises a crude-oil based fluid comprising a hydrocarbon, each sample of the plurality of samples comprises a drag reducing agent comprising a polymer, each sample of the plurality of samples has a different concentration of the drag reducing agent, and the drag reducing efficiency test comprises:
   placing the respective sample within an inner volume defined by a sample housing;
   submerging a sensing portion of a sensor in the respective sample within the sample housing, wherein the sensor comprises a disk and a supporting rod, the supporting rod comprises a first end and a second end, the first end is attached to the disk, and the disk is the sensing portion of the sensor;
   placing a lid on the sample housing to isolate the respective sample within the inner volume, wherein the lid defines an inner bore, and placing the lid on the sample housing comprises passing the supporting rod through the inner bore;
   after placing the lid on the sample housing, coupling the second end of the supporting rod of the sensor to an air bearing motor, wherein the air bearing motor is an aerostatic air bearing motor or an aerodynamic air bearing motor; and
   after coupling the second end of the supporting rod of the sensor to the air bearing motor, for each shear rate of a plurality of shear rates,
   rotating, by the air bearing motor coupled to the sensor, the sensor at the shear rate; and
   measuring, by the sensor and based on the air bearing motor rotating the sensor, a torque applied by the respective sample on the disk in response to the disk rotating while submerged in the respective sample at the respective shear rate, wherein the measurement of the torque is performed to thereby determine the drag reducing efficiency based on a correlation between the torque with the drag reducing agent and a torque of control without the drag reducing agent; and
   performing the drag reducing efficiency test on the remaining samples of the plurality of samples.

2. The method of claim 1, wherein the crude-oil based fluid comprises at least one of crude oil, gasoline, diesel, or jet fuel.

3. The method of claim 2, wherein the polymer has a molecular weight in a range of from 4,000,000 to 20,000,000 Daltons.

4. The method of claim 3, wherein each shear rate is in a range of from 1 inverse second ($s^{-1}$) to 5,000 $s^{-1}$.

5. The method of claim 4, wherein each sample of the plurality of samples have a different concentration of the drag reducing agent in a range of from 5 parts per million (ppm) to 200 ppm.

6. The method of claim 5, wherein:
the plurality of samples comprises the first sample, a second sample, a third sample, and a fourth sample;
the first sample has a drag reducing agent concentration of about 10 ppm;
the second sample has a drag reducing agent concentration of about 20 ppm;
the third sample has a drag reducing agent concentration of about 50 ppm; and
the fourth sample has a drag reducing agent concentration of about 100 ppm.

7. The method of claim 5, comprising displaying, by a computer communicatively coupled to the sensor, a plot comprising a curve of the measured torque versus shear rate for the first sample.

8. The method of claim 7, comprising displaying, by the computer, a composite plot comprising a plurality of curves, wherein each of the plurality of curves is a curve of the measured torque versus shear rate for a different one of each of the plurality of samples.

9. The method of claim 8, comprising performing the drag reducing efficiency test on a second plurality of samples, wherein the drag reducing agent is a first drag reducing agent, the polymer is a first polymer, each sample of the second plurality of samples comprises the crude-oil based fluid, each sample of the second plurality of samples comprises a second drag reducing agent comprising a second polymer, each sample of the second plurality of samples has a different concentration of the second drag reducing agent, the second polymer is different from the first polymer, and the second polymer has a molecular weight in a range of from 4,000,000 to 20,000,000 Daltons.

10. The method of claim 9, comprising displaying, by the computer, a second composite plot comprising a second plurality of curves, wherein each of the second plurality of curves is a curve of the measured torque versus shear rate for a different one of each of the second plurality of samples.

11. The method of claim 10, comprising comparing the first composite plot and the second composite plot to determine which of the first drag reducing agent or the second drag reducing agent is chosen for application.

* * * * *